March 15, 1927. 1,620,726
A. S. HOWELL
MOTION PICTURE CAMERA AND THE LIKE
Filed Sept. 13, 1923   7 Sheets-Sheet 4

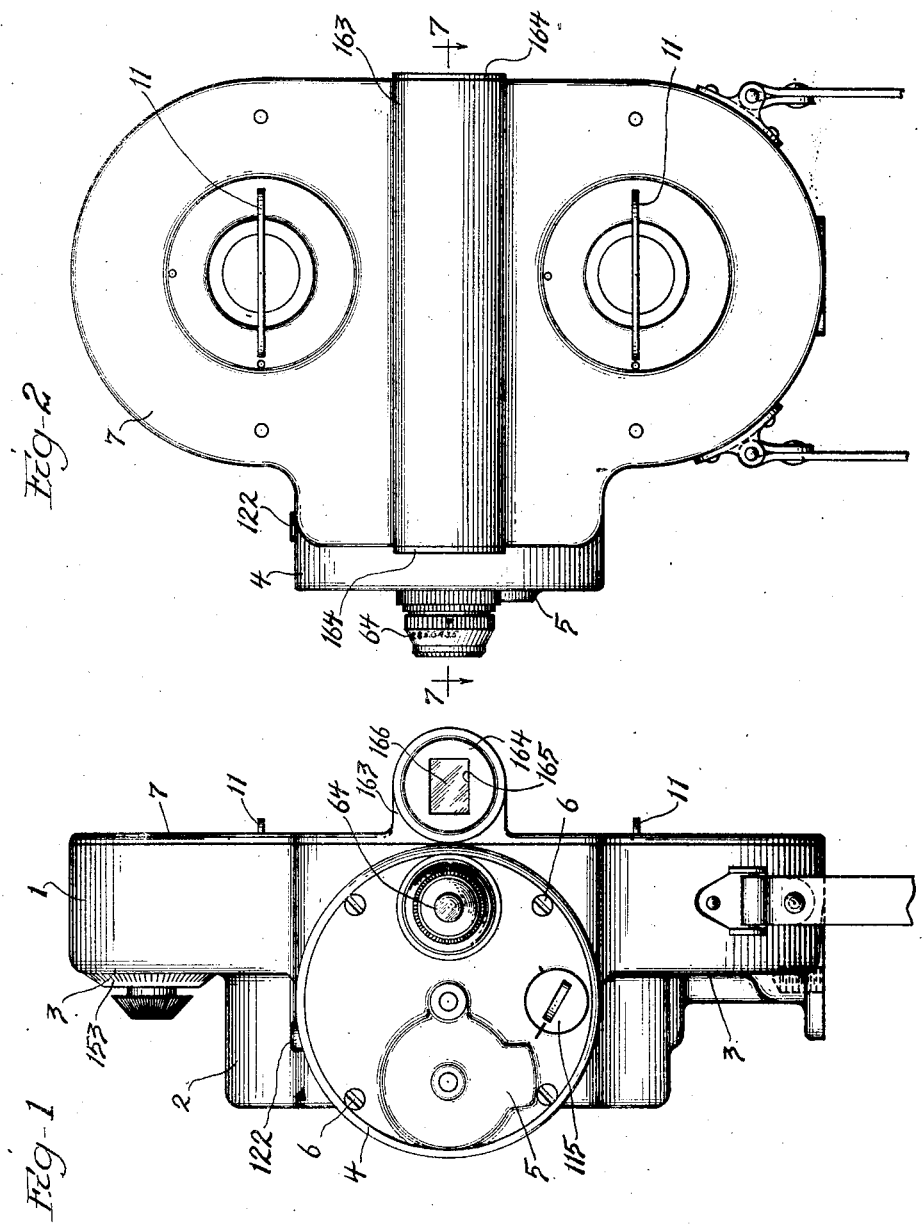

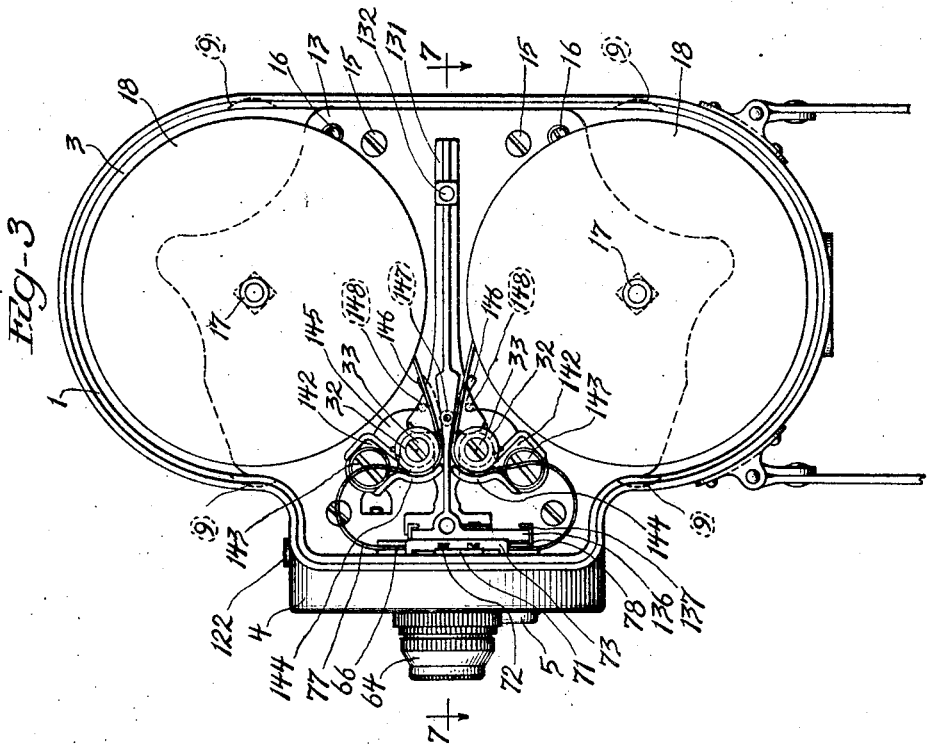

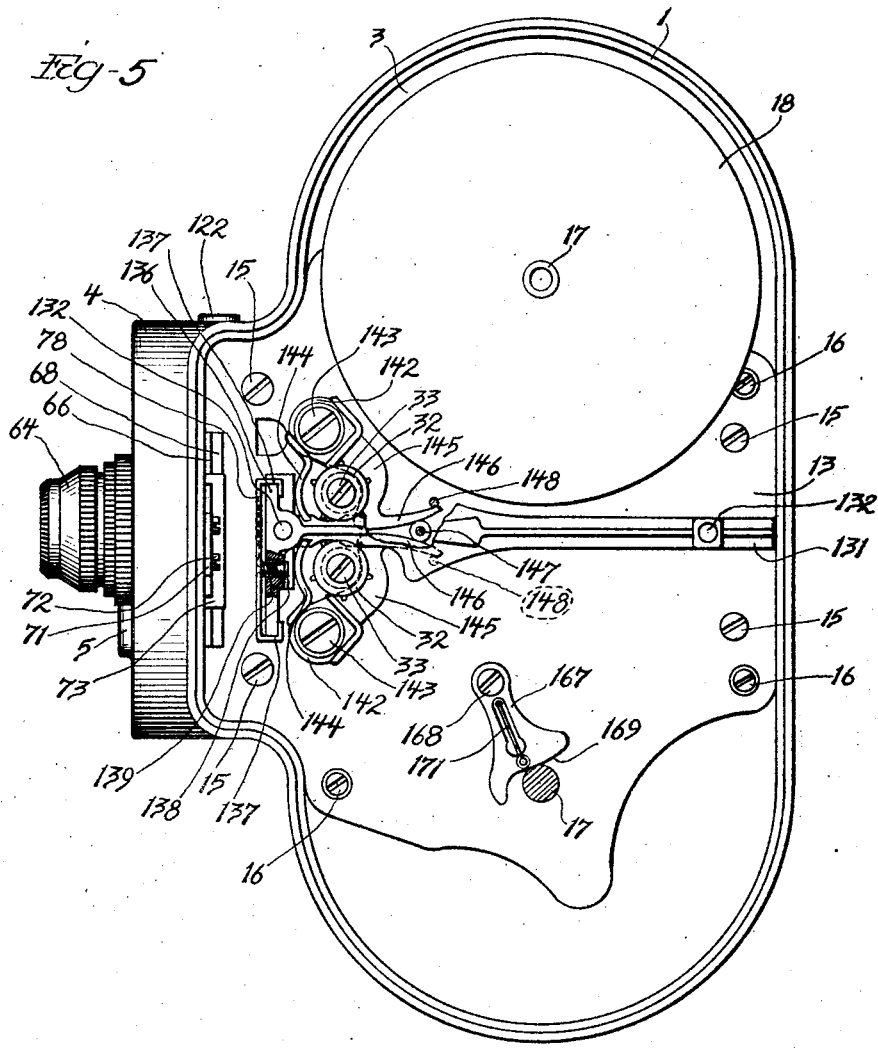

Inventor:-
Albert S. Howell
By Miehle & Miehle, Atty's

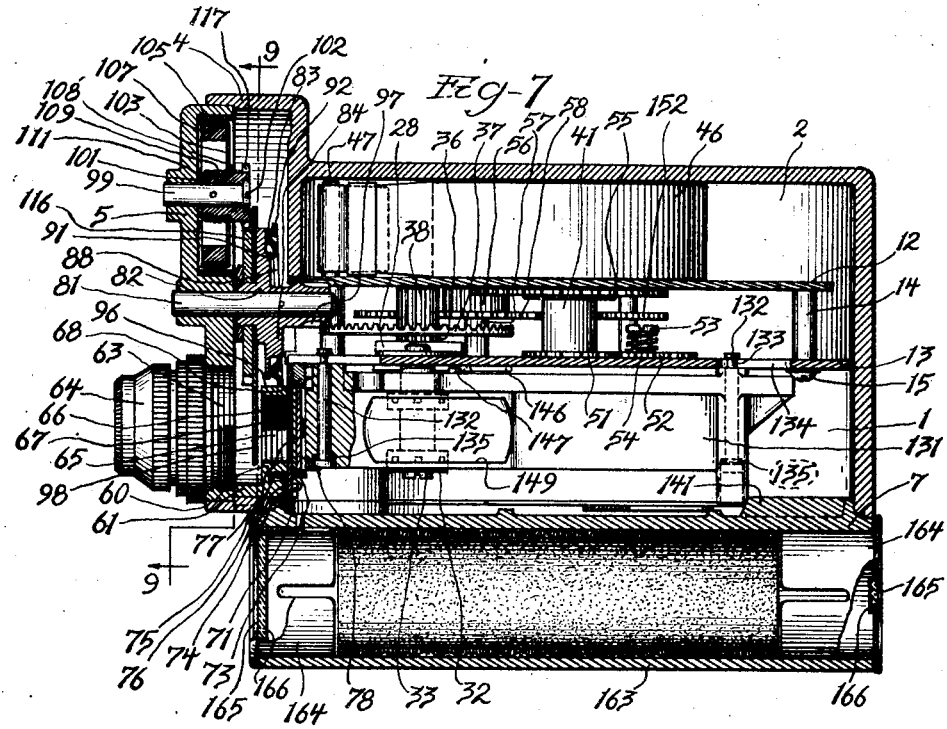
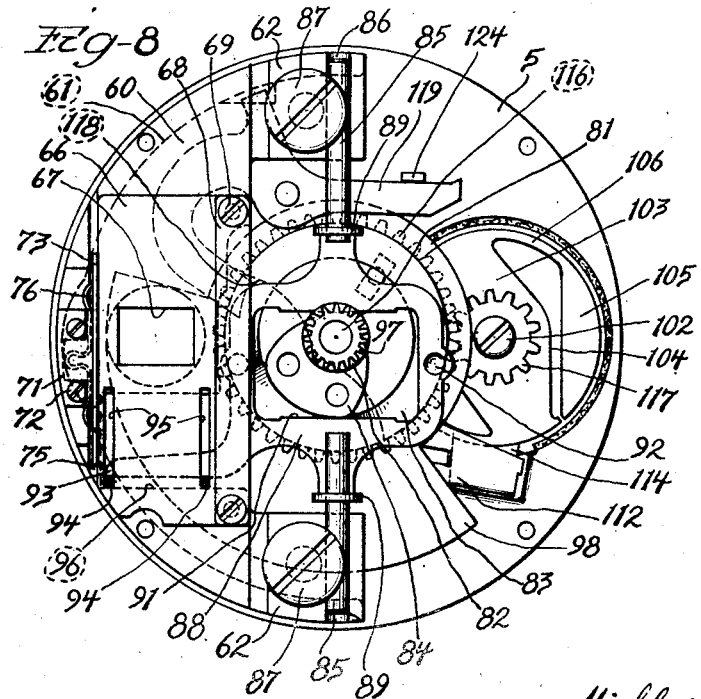

March 15, 1927.
A. S. HOWELL
1,620,726
MOTION PICTURE CAMERA AND THE LIKE
Filed Sept. 13, 1923    7 Sheets-Sheet 6

Inventor:—
Albert S. Howell
By:— Miehle & Miehle, Attys:—

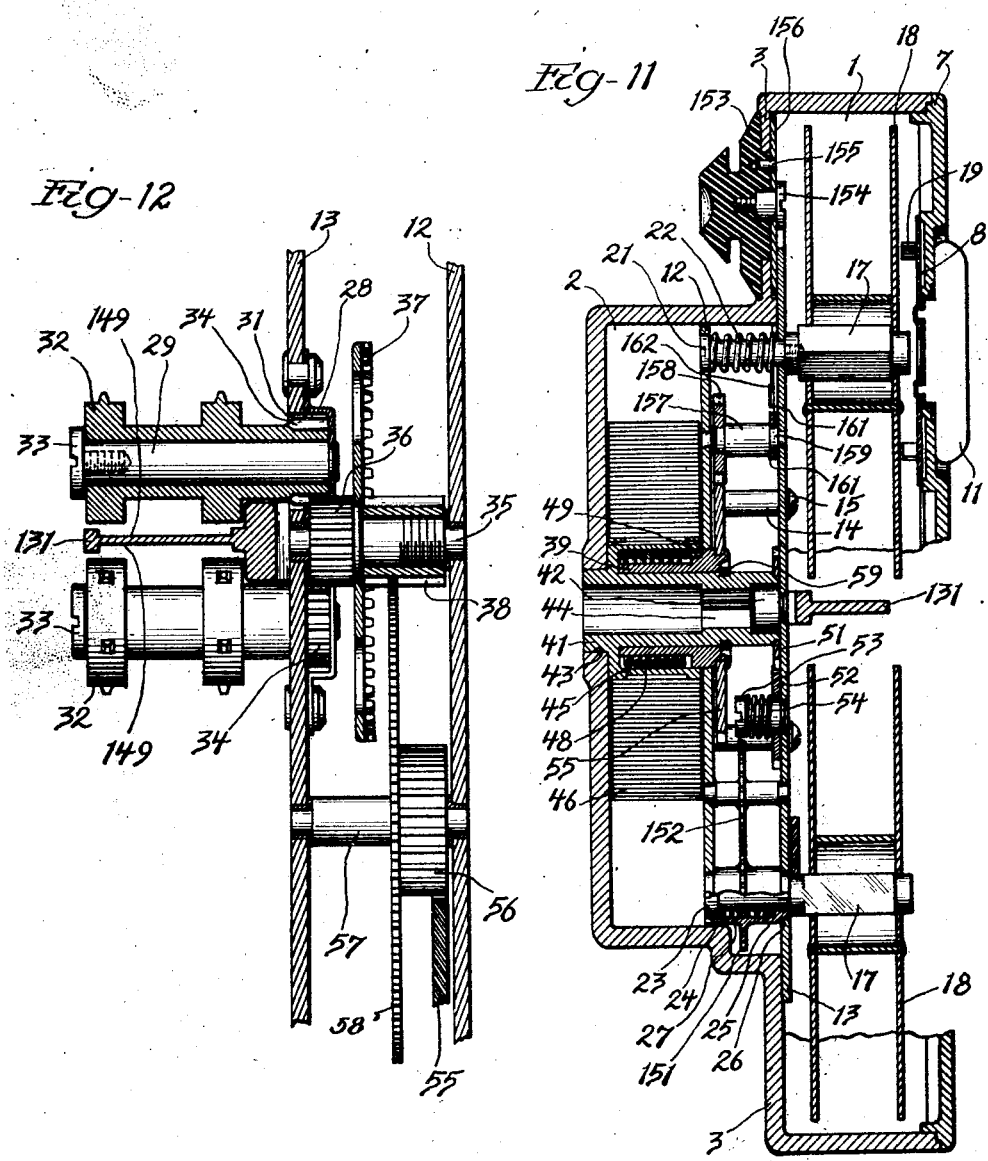

Patented Mar. 15, 1927.

1,620,726

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

MOTION-PICTURE CAMERA AND THE LIKE.

Application filed September 13, 1923. Serial No. 662,478.

My invention relates particularly to spring-motor driven motion picture cameras although not limited to this use alone.

The main features of the invention relate to the provision of a motion picture camera with a view toward lightness, compactness, ease and convenience of operation, simplicity and efficiency, convenience in assembly, and accessibility of operating parts.

With these features in view my invention consists in certain features of novelty in the construction, combination, and arrangement of parts by which the said features and certain other features are effected all as fully described with reference to the accompanying drawings and more particularly pointed out in the claims.

In the said drawings—

Figure 1 is a front view of a motion picture camera embodying the features of my invention.

Figure 2 is a side view of the same.

Figure 3 is a view similar to Fig. 2 with the cover removed.

Figure 4 is an inside face view of the cover.

Figure 5 is an enlarged view similar to Fig. 3, showing parts in different positions and with one of the film spools removed and with parts broken away and sectioned.

Figure 7 is an enlarged section on the line 7—7 of Fig. 2.

Figure 8 is a rear view of the front piece assembly hereinafter described.

Figure 11 is a section taken on the line 11—11 of Fig. 6 with parts broken away.

Figure 12 is an enlarged partial section taken on the line 12—12 of Fig. 6.

Like characters of reference indicate like parts in the several views.

Figure 9:
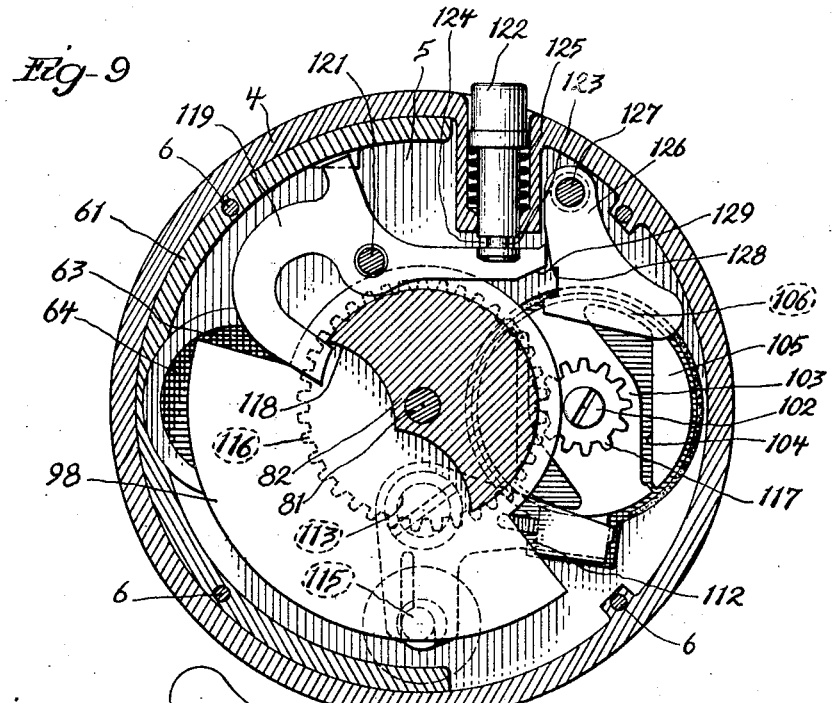
Figure 9 is an enlarged section on the line 9—9 of Fig. 7.

Referring to the drawings, the enclosing casing of the camera is open at one side and has the portion 1 adjacent the open side vertically elongated above and below the adjoining portion 2 of the casing which is circular in form and disposed centrally with respect to the elongated portion. The elongation of the portion 1 forms vertical wall portions 3 above and below the portion 2 at the inside of the portion 1 forming an intermediate outwardly facing surface within the casing and disposed in parallelism with the open side of the casing. See Figs. 1, 6, and 11. The casing is provided with a centrally disposed transverse circular portion 4 at the front of the casing extending forwardly from and merging with the portions 1 and 2 and having its circular opening outwardly shouldered and disposed on a rearwardly and forwardly extending axis and communicating with the enclosure formed by the portions 1 and 2. The opening of the portion 4 is closed by a circular front piece 5 detachably secured in the front end of this opening against the shoulder of the opening by means of headed screws 6. See Figs. 1, 7, and 9. The side opening of the casing is closed by a cover 7 releasably secured to the casing by a locking mechanism 8 on the inside thereof cooperating with undercut grooves 9 in the casing in an obvious manner, the locking mechanism being operated to lock and release by operating members 11 on the exterior of the cover.

A frame, comprising inner and outer plates 12 and 13 detachably secured together in spaced parallelism in a usual manner by means of spacing studs 14 and headed screws 15 and having the outer plate 13 extending vertically above and below the inner plate, is disposed within the casing with the inner plate disposed within the portion 2 of the casing and with the outer plate secured against the aforementioned surface within the casing, formed by the wall portions 3, by means of headed screws 16 whereby the frame is detachably secured within the casing inwardly of and in parallelism with the open side thereof, the frame being removable through said open side. See Figs. 5, 6, 7 and 11.

A pair of vertically spaced transversely disposed revoluble film spool spindles 17 are carried by the frame and extend outwardly therefrom toward the cover for the removable mounting thereon within the casing of respective film spools 18 in adjacent vertically spaced edgewise alinement between the frame and cover, the upper and lower ends of portion 1 of the casing being semicircular and conforming with the spools. The structure of the spool mount surfaces of the spindles and the spindle openings of the reels constitutes a part of the subject matter described and claimed in my co-pending application for improvement in reel and spindle mount therefor, filed March 8, 1923, Serial No. 623,689, and being clearly shown in the drawings herein requires no description except that the spools are rotatably fixed on respective spindles and are limited as to inward movement on the spindles and are removable over the outer ends of the spindles when the cover is removed. When the cover is locked on the casing inwardly extending lugs 19 on parts of the locking mechanism 8 limit movement of the spools outwardly. The upper spindle 17, which carries the feed spool, is carried on the frame by means of a headed stud screw 21 screwthreaded into the inner end of this spindle in axial alinement therewith and engaging for rotation coaxial holes in the inner and outer plates 12 and 13 with its shank and head respectively and a compression spring 22 encircling the shank of the screw stud and abutting its head and the outer plate 13 with its opposite ends to maintain the inner end of this spindle against the outer plate and to retard rotation of the spindle to prevent film wound on the feed spool from unwinding of its own accord. See Fig. 11. The lower spindle 17 which carries the rewind spool is carried on the frame in the following manner. A headed screw stud 23 is screwthreaded into the inner end of this spindle in axial alinement therewith. A bored gear hub 24, the bore of which is reduced adjacent its outer end, as shown at 25, engages for rotation a portion of the head of this screw stud with the inner end of its bore and the shank of this screw stud with the reduced portion of its bore. The exterior surface of this hub is reduced at its outer end forming an outwardly facing shoulder 26 and this reduced end is engaged for rotation in a hole in the outer plate 13. The head of the screw stud 23 is engaged for rotation in a hole in the inner plate 12, which hole is coaxial with the hole engaged by the gear hub 24. The hub 24 extends between the plates 12 and 13 and abuts the inner plate with its inner end and the outer plate with the shoulder 26, and the outer end of the hub abuts the inner end of said lower spindle, and a compression spring 27 encircles the shank of the screw stud 23 and abuts the head thereof and the shoulder formed by the reduced bore portion 25 of the hub with its opposite ends and prevents outward movement of the screw stud and forms a frictional driving connection between the gear hub and spindle as is usual in the driving of rewind spindles.

A bracket 28 consisting of a vertically extending plate having offset feet secured to the outer plate 13 extends between the plates 12 and 13 in adjacent parallelism with the outer plate near the front of the casing. See Figs. 6 and 12. A pair of transversely disposed vertically spaced parallel studs 29 are secured to the bracket 28 in front of the plane of the axes of the film spools 18 and extend outwardly therefrom through relatively large openings 31 in the outer plate. A pair of bored duplicate constant feed film sprockets 32 are revolubly mounted on respective studs 29 and project outwardly from the outer plate in film feeding alinement with the film spools 18, headed screws 33 screwthreaded into the outer ends of respective studs 29 preventing outward movement of the sprockets on the studs. The sprockets 32 have duplicate gears 34 formed on their inner ends which extend inwardly of the outer plate 13, and a shaft 35 is journaled in the plates 12 and 13 on a transverse axis between the studs 29 and passes through a relatively large hole in the bracket 28 and has a gear 36 formed thereon between the plates 12 and 13 and adjacent the outer plate 13 which gear meshes with the gears 34 of the sprockets whereby the sprockets are driven in the same direction and at the same speed. The enlargement of the shaft 35 forming the gear 36 is shouldered at its inner end and is engaged in the bore of an inwardly faced crown toothed gear 37 which is clamped thereagainst by a bore internally screwthreaded gear 38 screwthreaded on the rear end of the shaft 35 whereby the gears 36, 37, and 38 are secured together, all three of these gears being disposed between the plates 12 and 13. See Fig. 12.

Figure 10:
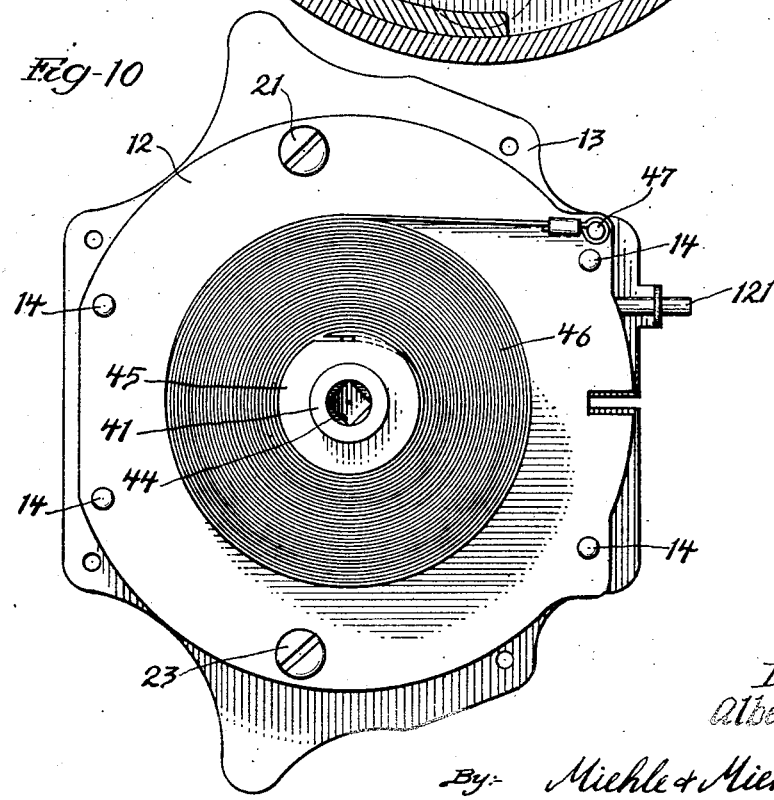
Figure 10 is an inside face view of the removable frame assembly hereinafter described.

The inner plate 12 is provided with a centrally disposed bore therethrough in which is journaled a concentrically bored hub member 39; see Fig. 11, which extends from both sides of the inner plate, and a hollow winding spindle 41 is journaled in the bore of said hub member and extends outwardly from both ends of the same. An inwardly projecting bearing stud 42 is secured to the outer plate and engages the bore of the spindle 41 whereby the end of the spindle adjacent the outer plate is supported for rotation, and the other end of this spindle is supported for rotation in a bore in the side of the casing opposite the open side thereof as designated at 43. This bore renders the spindle 41 accessible for winding and the bore of the spindle is provided with an intermediately disposed clutch formation 44 for engagement with a usual winding key, not shown, for rotating the spindle. The spindle 41 is provided with an exterior cylindrical flange 45 extending from the spindle at the outer end of the hub member 39 over the hub member in spaced relation therewith toward the inner plate, and a coiled power spring 46 is disposed on the outside of the inner plate 12 and, surrounding the flange 45, has its inner end secured thereto and its outer end secured to the frame by means of a stud 47 secured to the inner plate 12, see Fig. 10. A spring brake coil 48 is disposed in the space between the hub member 39 and the flange 45 of the spindle and has one end bent axially, as shown at 49 in Fig. 11, and engaged in a slot of the hub member to secure the brake coil to the hub member and is tensioned against the flange to form a one way driving connection between the hub member and the winding spindle whereby to permit independent rotation of the spindle in the direction to wind the spring. A stop gear 51 is secured to the end of the winding spindle adjacent the outer plate 13 and meshes with a stop gear 52 rotatably mounted and carried on the outer plate inwardly thereof by means of a headed stud 53 secured to the outer plate and extending inwardly therefrom, a coiled spring 54 encircling the shank of the stud and abutting the head of the stud and the gear 52 to normally maintain this gear against the outer plate and meshing with the gear 51 and permitting axial movement of the gear 52 to disengage from the gear 51 for setting the stop gearing. This stop gearing functions to limit both the winding and unwinding of the power spring.

The power spring device including the winding spindle 41 the hub member 39 and the power spring 46 is disposed on a transverse axis, and driving from the power spring device is effected by a multiplying gear train including gears carried by the frame between the plates 12 and 13 and disposed on transverse axes. See Figs. 6, 7, 11, and 12. These gears include a large primary spur gear 55 secured to the hub member 39 and meshing with a small spur pinion 56 disposed on a transverse axis between the plates 12 and 13 and mounted on a transverse shaft 57 extending between the plates and rotatably mounted on the plates. A large spur gear 58 is secured with the pinion 56 on the shaft 57 and meshes with the gear 38 whereby the shaft 35 is driven from the power spring device.

Axial movement of the hub member 39 outwardly of the inner plate 12 is limited by the gear 55, and a split ring 59, see Fig. 11, is engaged in an exterior groove on the winding spindle and engages the inner end of the hub member to limit axial movement of the hub member inwardly of the inner plate and at the same time limits movement of the winding spindle outwardly from the inner plate. The assembly on the frame is removable therewith as a unit through the open side of the casing, the winding spindle disengaging from the aforementioned bore 43 in the casing in the removal of the frame assembly whereby the frame assembly is accessible and whereby the casing is simple in construction and free from a plurality of formations machined to close limits and whereby the frame assembly is readily accessible for assembly and repair and mainly comprises conventional easily made parts, which are conveniently assembled and conducive to economical quantity production.

The detachable front piece 5 is provided with a rearwardly extending portion comprising a portion 60 rearwardly spaced from the main portion of the front piece and connected to the main portion of the front piece by a semicircular marginal flange 61. See Figs. 7, 8, and 9. The portion 60 extends in front of the portion 1 of the casing and extends above and below the axis of the front piece with vertically spaced portions 62 leaving the portion of the main portion of the front piece surrounding the axis thereof and the remaining portion thereof uncovered. The main portion of the front piece is provided with a rearwardly and forwardly extending lens aperture 63 disposed on an axis lying in a horizontal plane passing through the axis of the front piece, and a lens 64 of usual construction is screwthreaded therein. The rearwardly spaced portion 60 is provided with a light aperture 65 alined with the lens. The portion 60 has the rear face thereof disposed in a vertical transverse plane and secured thereagainst is a vertically extending front film face guide plate 66 provided with a light aperture 67 therethrough alined with the lens 64. A vertically extending stationary edge guide rail 68 is secured against the rear face of this plate at the inner side edge of the plate by headed screws 69 which also secure this edge of the plate to the portion 60 by passing through apertures in the guide rail and plate and screw-threading into the portion 60. The outer side edge portion of the plate 66 is provided with an intermediate lateral extension 71 which is secured to the portion 60 by a pair of vertically spaced headed screws 72. A vertically extending outer edge guide rail 73 embraces the extension 71 of the plate 66 with an intermediate vertical slot 74 therethrough and engages in a vertical slot 75 formed in the portion 60 at the outer edge of the main portion of the plate 66 and is yieldingly pressed inwardly by a bow spring 76 held in a recess in the portion 60 by the extension 71 whereby to accommodate film of varying width, the rail 73 projecting rearwardly of the rear surface of the plate 66 to guide a film 77 in the guide. A rear film face guide member 78 yieldably pressed forwardly against the film completes the intermittent feed film guide, the member 78 being carried in a manner hereinafter described.

A stud 81 is secured to the front piece 5 and extends rearwardly therefrom on the axis thereof, and revolubly mounted on this stud is a bored cam member 82 provided with an intermediate enlarged disk formation upon the rear face of which is formed a rearwardly facing face cam 83 and provided with a radial cam 84 immediately to the rear of the face cam. See Figs. 7, 8, and 9. This cam member is disposed to the inside of the aforementioned guide between the aforementioned vertically spaced portions 62 which are spaced longitudinally of the guide to the inside thereof. A pair of spaced and alined studs 85, disposed on a vertical axis parallel to the path of the film in the guide and to the inside of the inner edge of the film in the guide and intersecting the axis of the cam member and disposed respectively above and below the cam member, are secured in vertically alined grooves 86 formed in the rear faces of respective portions 62 by headed screws 87 screwthreaded into respective portions 62 and overlying the grooves. A shuttle plate 88 is disposed in a vertical plane immediately to the rear of the face cam 83, and has reduced upper and lower end portions disposed centrally with respect to the main portion of the plate, the extreme ends 89 of which are turned laterally to the rear out of the plane of the plate at right angles thereto. These ends 89 are bored coaxially on an axis extending in parallelism and in central relation with the main portion of the plate, and the studs 85 engage respective of these bores whereby the shuttle plate is mounted for pivotal movement on the stud axis and for movement therealong. The shuttle plate 88 is provided with a central aperture 91 elongated transversely of its pivotal axis and forming opposing surfaces extending transversely of the pivotal axis in intermediate relation with the studs. The radial cam 84 is engaged in said aperture 91 and operates upon said opposed surfaces to effect reciprocating film feeding and return movement of the shuttle plate along the studs 85 during rotation of the cam member. The shuttle plate has a pair of forwardly projecting cam engaging projections 92 thereon disposed on opposite sides of the pivotal axis thereof and arranged centrally and disposed on opposite sides of the aperture 91, which projections are engaged by the face cam 83 to effect oscillating film engaging and disengaging movement of the shuttle plate during rotation of the cam member and to limit rearward movement of the cam member. The shuttle plate lies in front of the front face guide plate 66 and is provided with an arm 93 disposed in the plane of the main portion thereof and extending therefrom across in front of the front face guide plate and below the aperture 67 therein, and this arm is provided with a pair of rearwardly projecting film perforation engaging teeth 94 which are spaced transversely of the path of the film in the guide and extend through transversely spaced longitudinally extending slots 95 in the front face guide plate to engage marginal perforations in the film in the guide for intermittently feeding the same. The portion 60 of the front piece is cut away as designated at 96 to clear the shuttle plate and the arm thereof. The cams 83 and 84 are arranged so that a closed path intermittent film feeding movement of the shuttle plate is effected during rotation of the cam member 82, each of the cams permitting movement of the shuttle plate by the other cam. The face cam 83 is arranged to maintain controlling relation with both cam projections 92 throughout the cycle of the mechanism. The cams 83 and 84 are arranged to intermittently feed the film downwardly with counter-clockwise rotation of the cam member 82 in Fig. 8.

The intermittent feeding mechanism hereinabove described is described and claimed per se in my co-pending application, Serial No. 572,169, filed July 1, 1922, for improvement in motion picture camera and the like.

A gear 97 is formed on the rear end of the cam member 82 and meshes with the crown toothed gear 37 carried by the frame whereby the cam member is driven from the power spring device.

A revolving light shutter 98 is secured on the cam member 82 immediately in front of the enlargement of the cam member and is disposed in a plane in front of the shuttle and the portion 60 of the front piece 5 and to the rear of the main portion of the front piece and cuts off the light from the lens 64 just in front of the light aperture 65. The shutter is timed to expose the film during each rest period thereof in the guide and to cut off the light during movement of the film in the guide as is usual.

A stud 99 is secured to the front piece 5 and extends rearwardly therefrom in parallelism with the stud 81 and is disposed on the side thereof opposite that on which the guide is disposed. Revolubly mounted on the stud 99 is a bored hub 101 which is retained thereon by a headed screw 102 screwthreaded into the rear end of the stud. A centrifugal governor wheel, comprising a concentrically bored cup shaped body member 103 having opposite slots 104 cut partially thereacross and forming segment portions 105 secured at one end to the remainder of the body member by connecting rim portions 106 of relatively small cross section and weights 107 secured on the inside of said segment portions, is mounted by means of its bore upon the hub 101 immediately in front of a forwardly facing shoulder 108 on the hub and is frictionally driven from the hub by means of a coiled compression spring 109 encircling the hub in front of the web of the wheel and abutting the web of the wheel and a nut 111 screw threaded on the forward end of the hub whereby the wheel is frictionally driven from the hub. The rim portions 106 are somewhat resilient and permit the weighted segment portions 105 to swing outwardly under centrifugal force and draw the segment portions inwardly with decrease of the centrifugal force.

The stud 99, hub 101, screw 102, and the governor wheel are disposed in front of the plane of the shutter 98, the governor wheel being disposed within a circular rearwardly facing recess formed in the front piece and disposed concentrically with the stud 99. A bell crank lever 112 is pivoted at 113 on the rear face of the front piece 5 below the stud 81, and one arm of this lever extends below the governor wheel and has a block 114 of friction material secured to its outer end which lies in an extension of the recess in which the governor wheel is disposed and is disposed to bear against the periphery of the governor wheel for controlling the speed thereof, the weighted segment portions 105 acting as hereinbefore described and cooperating with the block 114 to maintain a uniform speed in an obvious manner. The outer end of the bell crank lever 112 is engaged with an eccentric portion of a stud 115 pivotally mounted in the front piece 5 and having its front end exposed at the front side of the front piece and slotted, see Fig. 1, whereby the governor may be adjusted to vary its controlled speed.

A large spur gear is secured on the cam member 82 immediately in front of the shutter 98 and meshes with a small spur gear formed on the rear end of the hub 111 whereby the governor is driven from the cam member 82 by multiplying gearing to control the speed at which the camera is operated by the power spring device.

Figure 6:
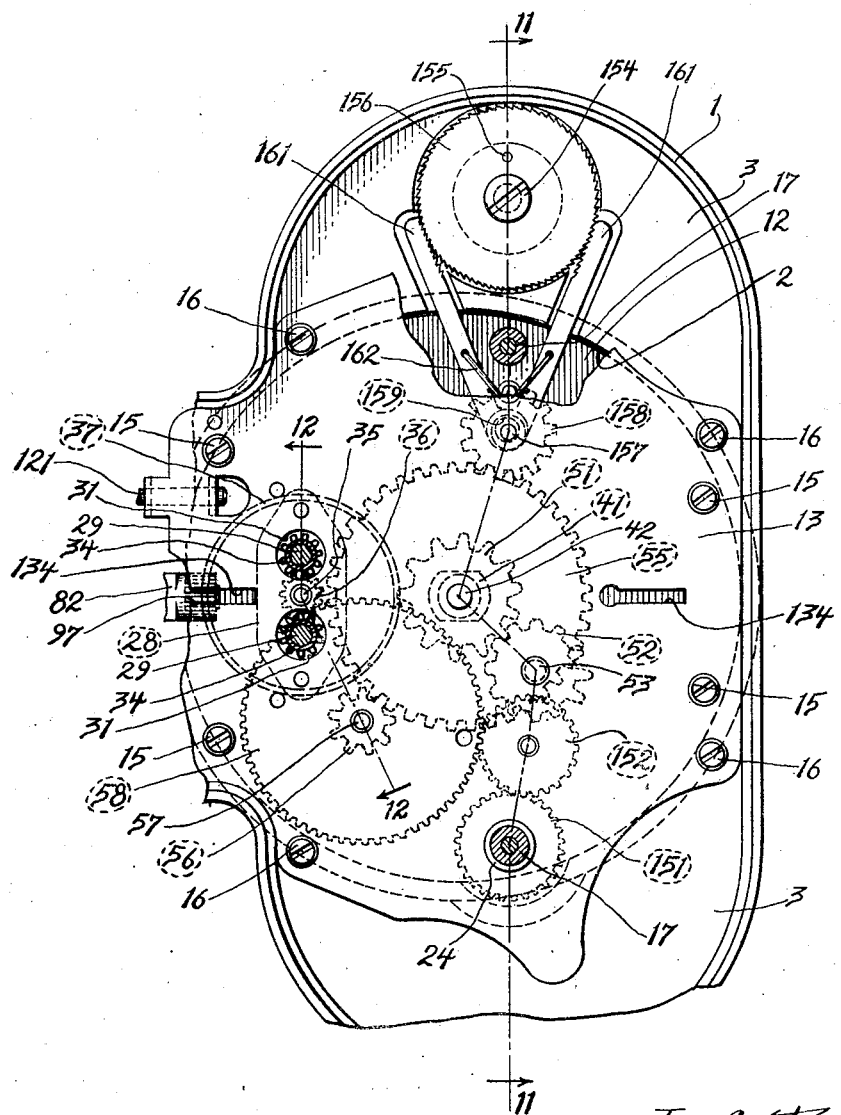
Figure 6 is a partial view similar to Fig. 5 with parts removed, parts broken away and parts in section.

The enlargement of the cam member 82 has a stop formation 118 thereon immediately to the rear of the shutter and forward of the face cam 83 which is engaged by a stop lever 119 which is mounted for pivotal movement by means of a forwardly extending stud 121 journaled in bearings on the plate 13, see Fig. 6, and on the front end of which stud the stop lever is secured. The stop lever 119 lies in front of the portion 60 of the front piece and it and the stud 121 are removed therewith. The stop lever 119 falls in front of the stop formation 118 to stop rotation of the cam member 82 to stop operation of the camera, as shown in Fig. 8, and is pivoted out of engagement with the stop formation to permit operation of the camera, the stop formation being timed to stop the cam member 82 with the shutter cutting off the light as shown in Fig. 8. The stop lever is manually controlled by a spring push button device comprising a vertically disposed push stud 122 mounted in a vertical bore in the circular front end of the casing and extending exteriorly of the casing and having a circumferential groove 123 at the lower end thereof which is engaged by a rearwardly extending lug 124 on the stop lever 119, and a coiled compression spring 125 encircling the push stud and abutting a downwardly facing shoulder on the push stud and an upwardly facing shoulder in said vertical bore to normally push the stud upwardly and move the stop lever into stop formation engaging position. A weighted lock lever 126 is pivotally mounted on a stud 127 secured to the casing at the rear of the front piece and is provided with a lock formation 128 adapted to engage with the adjacent end of the stop lever 119 when it is in its operating position to hold it in this position. The said adjacent end of the stop lever 119 is provided with a cam surface 129 adapted to engage the upwardly facing surface of the lock formation 128 to throw the lock lever 126 out of locking position whereby to permit movement of the stop lever to stopping position by downward movement of the push stud to move the weighted lever out of locking position and a quick release of the push stud to permit the spring 125 to move said adjacent end of the stop lever past the lock formation 128 before the lock lever moves into locking position by reason of the weight thereof. The lock lever permits removal of the stop lever with the front piece.

The film sprockets 32 are disposed in back of the intermittent feed film guide and are adjacently spaced longitudinally of the same and are in film feeding alinement therewith. A horizontal carrying bar 131 having its main portion flat and disposed in a horizontal plane extends from the rear of the guide rearwardly on the outside of the plate 13 between the sprockets 32 and film spools 18, and is mounted on the plate 13 by means of headed studs 132 extending through counterbored transverse holes through the bar and having circumferential grooves 133 adjacent the ends of their shanks engaged in forwardly and rearwardly extending slots 134 through the plate 13, spring washers 135 under the heads of the studs serving to hold the bar securely against the outer surface of the plate 13. See Figs. 3, 5, 6, and 7. Thus the bar 131 is mounted for forward and rearward movement, and the front slot 134 is open at its front end and the rear slot 134 is widened at its front end to permit removal and assembly of the bar on the plate 13. The bar 131 is provided at its front end with a vertical portion 136 disposed in a transverse plane and extending above and below the main portion of the bar. The aforementioned rear film face guide member 78 of the intermittent feed film guide is formed of an elongated rectangular plate having the ends thereof doubled back rearwardly, as shown at 137, see Fig. 5, and embracing respective ends of the portion 136 and permitting limited forward and rearward movement of the guide member 78 with respect to the portion 136. A headed stud 138, intermediately disposed with respect to the member 78, extends forwardly through a forwardly counterbored bore in the portion 136 for sliding movement and has the end of its shank riveted to the guide member 78, thus preventing transverse movement of the guide member. A coiled compression spring 139 encircles the shank of the stud 138 and abuts the member 78 and the bottom of the counterbored portion of said bore with its opposite ends to urge the member 78 to the forward end of its movement on the portion 136. When the bar 131 is in a rearward position the intermittent feed film guide is open for the insertion of the film therein, and when the bar 131 is in a forward position the film guide is closed and the spring 139 presses the guide member 78 against the film in the guide to retard movement of the film in the guide whereby to hold the same against accidental movement when the shuttle teeth 94 are out of engagement with the perforations in the film. The bar is maintained in its forward position when the cover is positioned on the casing by an inwardly extending lug 141 on the cover engaging in back of the bar. See Fig. 7.

A pair of guide members 142 are pivotally mounted on the outside of the outer plate 13, by means of headed screw studs 143, on axes parallel with the axes of the sprockets 32 and spaced longitudinally of the intermittent feed guide above and below the sprocket axes for movement into and out of film retaining position. See Figs. 3 and 5. These guide members 142 are provided with transversely disposed guide portions 144 in front of respective sprockets 32 for retaining portions of the film 77, leading from opposite ends of the feed guides, engaged with respective sprockets with the film portions extending from the ends of the feed guide in rearwardly curved compensating loops and then in front of respective adjacent sprockets and rearwardly therefrom between the sprockets to respective film spools 18, as shown in Fig. 3. When the guide members 142 are in a rearward position, as shown in Fig. 3, the guide portions 144 are in film retaining position, and when the guide members 142 are in a forward position, as shown in Fig. 5, the guide portions are out of film retaining position for the removal or lacing of the film on the sprockets. The guide members 142 are moved into and out of film retaining position respectively with feed guide closing and opening movements of said bar 131 in the following manner. Each guide member 142 is provided with an arm 145 which extends inwardly of the film path and exterior of the plate 13 toward the bar 131 and terminates in a rearwardly extending cam portion 146 underlying the portion of the bar 131 immediately to the rear of the sprockets 32, the bar being spaced from the plate 13 at this portion and extended upwardly and downwardly inwardly of the film path. See Figs. 3, 5 and 7. The cam portions 146 oppose each other, and mounted on the bar 131 is a cam roller 147 which is disposed between the cam portions 146 and cooperates therewith to move the guide members 142 into film retaining position with forward movement of the bar 131 from the open feed guide position shown on Figs. 5 to the closed feed guide position shown in Figs. 3 and 7. A pair of cam pins 148 are mounted on the bar 131 and are vertically spaced above and below the cam roller 147, and the cam portions 146 are confined in respective spaces between the cam roller 147 and the cam pins 148, whereby in addition to being moved into film retaining position with forward feed guide closing movement of the bar 131, the guide members 142 are moved out of film retaining position with rearward movement of the bar 131 from the closed feed guide position shown in Figs. 3 and 7 to the open feed guide position shown in Fig. 5. Thus the bar 131 controls the opening and closing of the feed guide and the movement of the guide members 142 into and out of film retaining position whereby to simplify the lacing and unlacing of the film, the lug 141 on the cover, engaging in back of the bar 131 as hereinbefore described, maintaining the guide members 142 in film retaining position when the cover is positioned on the casing.

The hereinbefore described main portion of the bar 131 extending between the sprockets 32 serves to guide the film portions between the sprockets and rearwardly thereof, the film portions lying respectively above and below the bar, and the bar has wide channels 149, alined with the picture portion of the film, formed in the film guiding surfaces thereof whereby only the edge portions of the film are engaged for obvious reasons. See Figs. 7 and 12.

The film guide surfaces of the bar 131 are disposed with relation to respective sprockets 32 and the sprockets are arranged to stop, when the stop lever 119 engages the stop formation 118, with the teeth thereof adjacent the bar disposed out of the plane of the axes of the sprockets, so that the film can be moved edgewise between the sprockets and bar for lacing and unlacing the film. See Figs. 5 and 12.

It will be observed that a simple, short and natural film path is provided, that the devices relating thereto are compactly arranged, that lacing and unlacing of the film is a simple operation, and that the film cannot become disarranged once it is laced and retained.

In the operation of the camera the film is fed from the upper or feed spool 18 under the upper sprocket 32 and upwardly in front of the same and leads into the upper end of the feed guide in a compensating loop. The film is fed downwardly in the feed guide and leads from the lower end thereof in a compensating loop and then upwardly in front of the lower sprocket 32 and over the same and rearwardly to the lower or rewind spool 18 upon which it is rewound. See Fig. 3. The lower or rewind spool 18 is driven to rewind the film by a spur gear 151 disposed between the plates 12 and 13 and formed on the hub 24 which drives the lower spindle 17 through the frictional driving connection hereinbefore described, and a spur gear 152 carried by the frame between the plates 12 and 13 thereof and disposed on a transverse axis and meshing with the gear 151 and the hereinbefore described gear 58. See Figs. 6, 7 and 11.

It will be observed that the major portion of the mechanism is carried by the detachable front piece 5 and the detachable frame formed by the plates 12 and 13, and that the mechanism carried thereby are removable therewith from the casing. This arrangement provides accessibility for assembly and repair, permits of a simple casing which is free from a plurality of formations machined to close limits, permits of a compact design, and tends toward ease of manufacture.

Rotatably mounted on a transverse axis in a bore through the upper wall portion 3 of the casing is an exterior calibrated footage recording dial 153 which cooperates with a mark, not shown, on the exterior of the casing. Disposed in a concentric recess in the inner face of this wall portion and secured to the dial by means of an axially disposed headed screw stud 154 and a pin 155 is a peripherally ratchet toothed wheel 156. See Figs. 6 and 11. Extending between and carried by the plates 12 and 13 on a transverse axis, parallel with the axis of the dial and ratchet wheel, and spaced below the ratchet wheel is a shaft 157 upon which a gear 158, disposed between the plates 12 and 13, is secured. The gear 158 meshes with the gear 55 whereby the shaft 157 is driven with the film feeding devices, and formed on the shaft 157 adjacent the inner face of the plate 13 is an eccentric 159. A pair of oppositely toothed ratchet bars 161 have transverse holes in their lower ends in which the eccentric 159 is engaged and extend upwardly therefrom on the inside of the plate 13 and in slots formed in the inner face of the upper wall portion 3 and embrace the ratchet wheel 156 therebetween with the ratchet teeth thereof engaging the teeth of the wheel. A tension spring 162 has its ends engaged with respective bars 161 and press the same against the wheel. As the eccentric 159 is rotated the ratchet bars are reciprocated and the ratchet wheel is rotated thereby at a greatly reduced speed, each ratchet bar holding the ratchet wheel against reverse rotation as the other ratchet bar ratchets over the teeth of the wheel on its non-feeding stroke. It will be observed that a great reduction of angular movement between the ratchet wheel and the eccentric shaft 157 is effected, and that the mechanism is quite simple and permits the removal of the frame formed of the plates 12 and 13, the ratchet bars being removed with the frame.

Formed integrally with the aforementioned cover 7 is an exterior rearwardly and forwardly extending tubular structure 163 disposed intermediate the top and bottom of the camera. Lens mounts 164 are removably telescoped in respective ends of the tubular structure 163 and are provided with central light openings 165, the opening of the front lens mount being rectangular to correspond with the light aperture 67 of the front guide plate 66, hereinbefore described, and the opening of the rear lens mount being a small circular one. See Figs. 1, 2 and 7. Lenses 166 forming a sighting combination are mounted on respective lens mounts 164 interiorly thereof, and the sighting device so formed is related with the camera lens 64 in its exposure of the film in the feed guide that the field seen through the sighting device is substantially the same as that projected upon the film through the camera lens.

The tubular structure 163 is adapted to be grasped by one hand of the operator in holding the camera for operation with one eye of the operator sighting through the sighting device, and the hereinbefore described exteriorly accessible push stud 122 is disposed to be operated by a finger of the other hand of the operator in holding the camera for operation as above described. Thus the camera is conveniently held and operated with the operator sighting continuously during the taking of pictures.

The lower spindle 17 is prevented from rotation in a direction to unwind the film on the lower spool 18 mounted on the spindle by means of locking plate 167, pivotally mounted on the exterior of the plate 13 by means of a headed screw stud 168 and having an eccentrically disposed surface 169 engageable with the spindle and a spring 171 maintaining the plate with the surface 169 thereof engaged with the spindle. See Fig. 5. This device permits rotation of the said lower spindle 17 in the direction to rewind the film, i. e., clockwise in Fig. 5, but prevents rotation of this spindle in the opposite direction by reason of the plate 167 cramping against the spindle by reason of the eccentric disposition of the surface 169.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

Claims:

1. A motion picture camera including an enclosing casing open at one side, a frame comprising plates secured together in spaced parallelism and removably secured in said casing inwardly of said open side and in parallelism therewith and removable through said open side, a power spring device carried on the frame on a transverse axis and having the spring thereof disposed on the outside of the inner plate thereof, and a multiplying gear train for driving from the spring device and comprising gears carried by the frame between the plates thereof.

2. A motion picture camera including an enclosing casing open at one side, a frame comprising plates secured together in spaced parallelism and removably secured in said casing inwardly of said open side in parallelism therewith and removable through said open side, a power spring device carried on the frame including a coiled power spring disposed on the outside of the inner plate of the frame on a transverse axis and a winding spindle disposed on a transverse axis and extending outwardly from said inner plate toward the other side of the casing, said other side of the casing being provided with a bore therethrough whereby the spindle is accessible for winding, and a multiplying gear train for driving from the spring device comprising gears disposed on transverse axes and carried by the frame between the plates thereof.

3. A motion picture camera including an enclosing casing open at one side, a frame comprising two plates secured together in spaced parallelism and removably secured in said casing inwardly of said open side and in parallelism therewith, a winding spindle carried by the frame on a transverse axis and extending outwardly of the inner plate, a coiled power spring disposed on the outside of the inner plate and having its inner end secured to said spindle and its other end secured to said frame, a multiplying gear train comprising gears carried by the frame and disposed between the plates thereof on transverse axes and including a primary gear disposed coaxially with the spindle, an automatic one way driving connection for driving the primary gear from the spindle and permitting independent rotation of the spindle in the direction to wind the spring, and stop gearing carried by the frame and connected with said spindle.

4. A motion picture machine including an enclosing casing open at one side, a frame comprising two plates secured together in spaced parallelism and removably secured in said casing inwardly of said open side and in parallelism therewith, the inner plate being provided with a centrally disposed bore therethrough, a concentrically bored hub member journaled in said bore and extending from both sides of the inner plate, a hollow spindle journaled in the bore of said hub member and extending outwardly from both ends of the same, a bearing stud secured on the outer plate and engaging the bore of the spindle, an exterior cylindrical flange on the spindle extending from the spindle at the outer end of the hub member over the hub member in spaced relation therewith toward the inner plate, a coiled power spring disposed on the outside of the inner plate and having its inner end secured to said flange and its outer end secured to the frame, a spring brake coil disposed in the space between the flange of the spindle and the hub member and secured to one of them and tensioned against the other to form a one way driving connection therebetween whereby to permit independent rotation of the spindle in the direction to wind the power spring, a multiplying gear train comprising gears carried by the frame and disposed between the plates thereof on transverse axes and including a primary gear secured to said hub member, said casing having a bore through the other side thereof, said spindle engaging in said bore for rotation, and a clutch formation in the bore of the spindle for winding the same.

5. A motion picture camera including an enclosing casing open at one side and having the portion adjacent the open side vertically elongated and forming an intermediate outwardly facing surface within the casing, a frame removably secured in the casing against said surface, and operating mechanism including gearing mounted on said frame and disposed in the portion of the enclosure of the casing inward of said surface.

6. A motion picture machine including an enclosing casing open at one side and having the portion adjacent the open side vertically elongated above and below the adjoining portion thereof and forming an intermediate outwardly facing surface within the casing, a frame comprising plates secured together in spaced parallelism and having the outer plate thereof extending vertically above and below the inner plate and detachably secured against said surface with the inner plate disposed within said adjoining portion, a pair of revoluble film spools removably carried by the frame on transverse axes and disposed in vertically spaced edgewise relation outwardly thereof, devices for feeding and exposing a film in a path outwardly of the frame, and gearing carried by said frame between the plates thereof for driving said feeding and exposing devices and one of the film spools.

7. A motion picture camera including an enclosing casing open at one side and having the portion adjacent the open side vertically elongated above and below the adjoining portion thereof and forming an intermediate outwardly facing surface within the casing, a frame comprising plates secured together in spaced parallelism and having the outer plate thereof extending vertically above and below the inner plate and detachably secured against said surface with the inner plate disposed within said adjoining portion, a pair of vertically spaced transversely disposed film spool spindles carried by the frame and projecting outwardly from the outer plate thereof, devices for feeding and exposing a film in a path outwardly of said frame, a power spring device carried by the frame including a power spring disposed on a transverse axis on the outside of said inner plate, and gearing including a multiplying gear train and carried by the frame between the plates thereof and comprising spur gears disposed on transverse axes for driving said feeding and exposing devices and one of said spool spindles from the power spring device.

8. A motion picture camera including an enclosing casing provided with front and side openings, a front piece detachably secured to the casing and closing the front opening thereof, a frame removably secured in the casing and removable through said side opening, devices for feeding and exposing a film including a revoluble member carried by said front piece, and gearing carried by said frame for driving said revoluble member.

9. A motion picture camera including an enclosing casing provided with front and side openings, a front piece detachably secured to the casing and closing the front opening thereof, a frame removably secured in the casing and removable through said side opening, devices for feeding and exposing a film including revoluble members respectively carried by said front piece and frame, and a disengageable driving connection for operating said revoluble members in unison.

10. A motion picture camera including an enclosing casing provided with front and side openings, a front piece detachably secured to the casing and closing the front opening thereof a removable cover closing said side opening, a frame removably secured in the casing and removable through said side openings, and disposed inwardly of the open side thereof, devices for feeding and exposing a film in a path between said frame and cover including revoluble members respectively carried by said front piece and frame, and meshed gears carried respectively by said front piece and frame for driving said revoluble members in unison.

11. A motion picture camera including an enclosing casing provided with front and side openings, a front piece detachably secured to the casing and closing the front opening thereof, a frame removably secured in the casing and disposed inwardly of the open side thereof, an intermittent film feeding device including a revoluble member carried by the front piece and disposed on a rearwardly and forwardly extending axis inwardly of the open side of the casing, a shutter mounted on said revoluble member, a constant film feeding device carried by said frame including a second revoluble member disposed on a transverse axis, and means for driving said revoluble members in unison including a gear on said first mentioned revoluble member and a crown toothed gear carried by said frame on a transverse axis and meshing with said first mentioned gear.

12. A motion picture camera including an enclosing casing provided with front and side openings, a front piece detachably secured to the casing and closing the front opening thereof, a frame comprising plates secured together in spaced parallelism and removably secured in said casing inwardly of said open side in parallelism therewith, an intermittent film feeding device including a revoluble member carried by the front piece and disposed on a rearwardly and forwardly extending axis, a shutter mounted on said revoluble member, a gear on said revoluble member, a pair of vertically spaced constant feed film sprockets carried by said frame and disposed on parallel transverse axes, gears on the inner ends of said sprockets extending in the space between said plates, a gear carried by the frame between the plates thereof and meshing with said last mentioned gears, and another gear secured with this gear and disposed between said plates and meshing with said first mentioned gear.

13. A motion picture camera including an enclosing casing provided with front and side openings, a front piece detachably secured to the casing and closing the front opening thereof, a frame comprising plates secured together in spaced parallelism and removably secured in said casing inwardly of said open side in parallelism therewith, an intermittent film feeding device including a shuttle carried by the front piece and a revoluble cam member carried by the front piece and disposed on a rearwardly and forwardly extending axis, a shutter mounted on said cam member, a gear on the rear end of said cam member, a bracket secured on said outer plate and extending between said plates in adjacent spaced relation with the outer plate, a pair of transversely disposed vertically spaced parallel studs secured to said bracket and extending outwardly therefrom, said outer plate being provided with relatively large openings through which said studs pass, a pair of constant film feed sprockets revolubly mounted on respective studs, gears on the inner ends of said sprockets extending inwardly of said outer plate, a gear carried by the frame on a transverse axis between the plates thereof and meshing with said last mentioned gears, and a crown toothed gear secured with said last mentioned gear and meshing with said first mentioned gear.

14. A motion picture camera including an enclosing casing provided with front and side openings, a front piece detachably secured to the casing and closing the front opening thereof, a frame removably secured in the casing, devices for intermittently feeding and exposing a film including a revoluble member carried by said front piece, a speed governor carried by said front piece for controlling the speed of said revoluble member, a manually releasable stop device including a stop formation on said revoluble member, a power spring device carried by said frame, and gearing including a multiplying gear train and carried by said frame for driving said feeding and exposing devices from the spring device.

15. A motion picture camera including an enclosing casing provided with front and side openings, a front piece detachably secured to the casing and closing the front opening thereof, a frame removably secured in the casing and disposed inwardly of the open side thereof, devices for intermittently feeding and exposing a film in a path outwardly of said frame including a revoluble cam member carried by said front piece on a rearwardly and forwardly extending axis, a centrifugal speed governor carried by said front piece on an axis parallel to said revoluble cam member, multiplying gearing for driving said speed governor from said revoluble cam member, a manually releasable stop device including a stop formation on said revoluble cam member, a power spring device carried by said frame, and means for driving said feeding and exposing devices from the spring including a second revoluble member carried by said frame for driving said first mentioned revoluble cam member.

16. A motion picture camera including an enclosing casing provided with front and side openings, a front piece detachably secured to the casing and closing the front opening thereof, a frame comprising two plates secured together in spaced parallelism and removably secured in said casing inwardly of said open side in parallelism therewith, an intermittent film feeding device including a revoluble member carried by the front piece and disposed on a rearwardly and forwardly extending axis, a shutter mounted on said revoluble member, a centrifugal speed governor carried by said front piece on an axis parallel to said revoluble member, multiplying gearing for driving said speed governor from said revoluble member, a manually releasable stop device including a stop formation on said revoluble member, a gear on the rear end of said revoluble member, a second gear carried on the frame between the plates thereof and disposed on a transverse axis and meshing with said first mentioned gear for driving the same, a power spring device carried by said frame on a transverse axis and including a power spring disposed on the outside of the inner plate thereof, and a multiplying gear train carried by said frame and comprising gears disposed between said plates on transverse axes for driving said second gear from the spring.

17. A motion picture camera including a detachable front piece, an intermittent film feed guide including a rearwardly spaced apertured front face guide plate carried by the front piece, means carried on the front piece for intermittently feeding a film in said guide including a revoluble cam member disposed on a rearwardly and forwardly extending axis to one side of the guide, and a revoluble light shutter secured with the cam member and disposed in a plane in front of said guide plate.

18. A motion picture camera including a detachable front piece, an intermittent film feed guide including a rearwardly spaced apertured front face guide plate carried by the front piece, a shuttle carried by the front piece and movable on and along an axis to one side and extending longitudinally of the guide and extending in front of said guide plate with a toothed film engaging portion for feeding a film in said guide, a revoluble cam member carried by said front piece and disposed on a rearwardly and forwardly extending axis disposed to said side of the guide for operating said shuttle on and along its axis to feed the film and a revoluble light shutter secured to the cam member and disposed in a plane in front of said shuttle.

19. A motion picture camera including a detachable front piece provided with a rearwardly extended portion, an intermittent film feed guide including an apertured front face guide plate mounted on said rearwardly extended portion, said rearwardly extended portion including portions spaced longitudinally of the guide to one side thereof, a pair of spaced and alined studs secured to respective of said spaced portions on an axis to said side and extending longitudinally of the guide, a shuttle plate disposed similar to said guide plate and mounted on said studs for movement on and along the axis thereof and extending in front of said guide plate with a toothed film engaging portion for feeding a film in said guide, a revoluble cam member carried by the front piece on a rearwardly and forwardly extending axis between said studs for operating the shuttle on and along its axis, and a revoluble light shutter secured to the cam member and disposed in a plane in front of said shuttle.

20. A motion picture camera including a detachable front piece, intermittent film feeding mechanism including a revoluble member carried on said front piece and disposed on a rearwardly and forwardly extending axis, a revolving light shutter secured to said revoluble member, a speed governor carried by the front piece for controlling the speed of said revoluble member, a stop device including a stop formation on said revoluble member, and a gear on said revoluble member whereby it is driven.

21. A motion picture camera including a detachable front piece, a pair of spaced rearwardly extending studs mounted thereon, intermittent film feeding mechanism including a film feeding shuttle carried by said front piece and a bored cam member revolubly mounted on one of said studs for operating the shuttle, a revolving light shutter secured to said cam member, a centrifugal speed governor including a bored revolving member revolubly mounted on the other stud, a large spur gear secured to the cam member, a small spur gear secured to said revolving member of the governor and meshing with the large gear, a stop device including a stop formation on said cam member, and a gear on the rear end of said cam member whereby it is driven.

22. A motion picture camera including an intermittent film feed guide, a pair of constant feed film sprockets rotating in the same direction and disposed in back of the guide and adjacently spaced longitudinally of the guide for feeding a film to and from respective ends of the guide, a pair of guide members extending in front of respective sprockets for retaining portions of a film, leading from opposite ends of the guide, engaged with respective sprockets with the film portions extending from the ends of the guide in compensating loops and then in front of respective sprockets and rearwardly therefrom between the sprockets and movable into and out of film retaining position, a carrying member carrying the rear film face guide portion of the feed guide and extending rearwardly therefrom between and rearwardly of the sprockets and adapted for guiding the film between and rearwardly of the sprockets and movable forwardly and rearwardly to close and open the feed guide, and means for moving the guide members into and out of film retaining position respectively with feed guide closing and opening movements of said carrying member.

23. A motion picture camera including an intermittent film feed guide, a pair of constant feed sprockets rotating in the same direction and disposed in back of the guide and adjacently spaced longitudinally of and in film feeding alinement with the same, a pair of guide members extending in front of respective sprockets for retaining a film thereon and pivotally mounted on axes parallel with the sprocket axes and spaced longitudinally of the guide above and below the sprocket axes for movement into and out of film retaining position, a carrying member carrying the rear film face guide portion of the feed guide and extending rearwardly therefrom between and rearwardly of the sprockets and adapted for guiding the film between the sprockets and rearwardly thereof and movable forwardly and rearwardly to close and open the feed guide, portions on the guide members extending toward the carrying member and having opposing cam portions, and means cooperating with said cam portions to effect movement of said guides into and out of film retaining position respectively with feed guide closing and opening movement of said carrying member including a member mounted on said carrying member and disposed between and engaging both cam portions.

24. A motion picture camera including an intermittent film feed guide, a pair of constant feed sprockets rotating in the same direction and disposed in back of the guide and adjacently spaced longitudinally of and in film feeding alinement with the same, a pair of guide members extending in front of respective sprockets for retaining a film thereon and pivotally mounted on axes parallel with the sprocket axes and spaced longitudinally of the guide above and below the sprocket axes for movement into and out of film retaining position, a carrying member carrying the rear film face guide portion of the feed guide and extending rearwardly therefrom between and rearwardly of the sprockets and adapted for guiding the film between the sprockets and rearwardly thereof and movable forwardly and rearwardly to close and open the feed guide, arms on the guide members extending toward the carrying member and terminating in adjacent rearwardly extending cam portions, and three spaced cam portion engaging members mounted on the carrying member confining said cam portions in respective spaces therebetween and cooperating with said cam portions to effect movement of said guides into and out of film retaining position respectively with feed guide closing and opening movement of said carrying member.

25. A footage recording device including a revoluble peripherally toothed ratchet wheel, a driven eccentric disposed on an axis spaced from said ratchet wheel and parallel to the axis thereof, a ratchet bar provided with a transverse hole engaged by said eccentric for operating the bar, and a spring pressing said ratchet bar against said ratchet wheel.

26. A footage recording device including a revoluble ratchet wheel, a driven eccentric, a pair of oppositely toothed ratchet members operated by said eccentric and engaging the teeth of the ratchet wheel with their teeth at respective opposite points, and spring means pressing the ratchet members against the wheel.

27. A footage recording device including a revoluble peripherally toothed ratchet wheel, a driven eccentric disposed on an axis spaced from the wheel and parallel to the axis thereof, a pair of oppositely toothed ratchet bars provided with transverse holes in which the eccentric is engaged and extending from the eccentric and embracing the ratchet wheel therebetween with the ratchet teeth thereof engaging the teeth of the wheel, and a spring pressing the ratchet bars against the wheel.

28. A motion picture camera including an enclosing casing open at one side, a frame removably secured in said casing and removable through said open side, a revoluble ratchet wheel carried by the casing, a driven eccentric carried by the frame, a pair of oppositely toothed ratchet members carried by the frame and operated by the eccentric and engaging the teeth of the ratchet wheel with their teeth at respective opposite points, spring means pressing the ratchet members against the wheel, and a recording member on the casing operated by the ratchet wheel.

29. A motion picture camera including an enclosing casing open at one side, a frame removably secured in said casing and removable through said open side, a revoluble peripherally toothed ratchet wheel carried by the casing on a transverse axis, a driven eccentric carried by the frame on a transverse axis spaced from the ratchet wheel, a pair of oppositely toothed ratchet bars provided with transverse holes in which the eccentric is engaged and extending from the eccentric and embracing the ratchet wheel therebetween with the ratchet teeth thereof engaging the teeth of the wheel, and a tension spring having its ends engaged with respective bars and pressing the same against the wheel.

30. The combination in a motion picture camera of an enclosing structure including a detachably secured cover forming one side of the enclosing structure, an exterior rearwardly and forwardly extending tubular structure formed integrally with the cover and adapted to be grasped by the operator in holding the camera, lens mounts removably telescoped in respective ends of the tubular structure, and lenses forming a sighting combination mounted on respective of said lens mounts.

31. The combination in a motor driven motion picture camera of an enclosing structure, a sighting device including an exterior rearwardly and forwardly extending tubular structure on the enclosing structure and adapted to be grasped by one hand of the operator in holding the camera for operation, and an exteriorly accessible control member on the camera for controlling the operation thereof and disposed to be accessible for operation by a finger of the other hand of the operator in holding the camera for operation.

32. The combination in a spring motor driven motion picture camera of an enclosing structure including a detachably secured cover forming one side of the enclosing structure, a sighting device including an exterior rearwardly and forwardly extending tubular structure formed integrally with the cover and disposed intermediate the top and the bottom of the camera and adapted to be grasped by the operator in holding the camera for operation, and an exteriorly accessible push stud on the camera for controlling the operation thereof and disposed to be operated by a finger of the other hand of the operator in holding the camera for operation.

In witness whereof, I hereunto affix my signature this 10th day of September, 1923.

ALBERT S. HOWELL.